United States Patent [19]

Hansen et al.

[11] Patent Number: 4,909,837

[45] Date of Patent: Mar. 20, 1990

[54] PROCESS AND APPARATUS FOR GRANULATING MOLTEN SLAG

[75] Inventors: Uwe-Jens Hansen, Hamburg; Werner Marnette, Hollenstedt, both of Fed. Rep. of Germany

[73] Assignee: Norddeutsche Affinerie Aktiengesellschaft, Hamburg, Fed. Rep. of Germany

[21] Appl. No.: 320,350

[22] Filed: Mar. 8, 1989

[30] Foreign Application Priority Data

Mar. 9, 1988 [DE] Fed. Rep. of Germany ....... 3807720

[51] Int. Cl.⁴ .............................................. C22B 7/04
[52] U.S. Cl. ............................................ 75/24; 65/19; 65/141; 241/23; 266/137
[58] Field of Search ................. 75/24; 266/137; 65/19, 65/141; 241/3, 23

[56] References Cited

U.S. PATENT DOCUMENTS 4,637,591 1/1987 McMahon et al. ...................... 75/24

Primary Examiner—Melvyn J. Andrews
Attorney, Agent, or Firm—Herbert Dubno

[57] ABSTRACT

A process and apparatus for granulating slag in which molten slag is charged into a drum and is solidified and granulated therein on cooled surfaces. To ensure a rapid cooling at a high thruput rate, the molten slag is applied to the inside surface of a drum, which rotates on a horizontal axis and has a cooled shell, and the solidified film of slag is mechanically detached from the inside surface after about three-quarters of a revolution of the drum and is discharged.

8 Claims, 1 Drawing Sheet

PROCESS AND APPARATUS FOR GRANULATING MOLTEN SLAG

FIELD OF THE INVENTION

Our present invention relates to a process and apparatus for granulating molten metallurgical slag.

BACKGROUND OF THE INVENTION

Molten slag at high temperature is usually produced in the smelting of ores and in the fining or refining of raw metal. The tapping of the slag removes heat from the system at a high rate and the liquid slag is cooled and assumes a solid state in a relatively short time and can then be handled, with some difficulty.

In general, the slag has limited economic value. Only a small part of the slag is used as a building material and a major part may have to be dumped as a waste material, although it contains substantial thermal energy, and is lost for the recovery of the heat that has been removed from the system.

As the recognition of economical problems and of the need to save energy has increased, numerous efforts have been made to direct more attention to the recovery of energy in molten waste slag.

Japanese Patent 61-08 357 (C.A. Vol. 105, Ref. 9845 y) discloses, for the granulating of slag, an apparatus that consists of a compact drum. Water-cooled wings are attached to a central shaft and are reversibly rotated to divide the slag. The bottom half of the drum is cooled by flowing water and the water which has been heated is delivered to a plant for a recovery of energy. The drum has a lateral inlet and an outlet for discharging the granulated slag.

In the process disclosed in Japanese Patent 58-199,034 (C.A. Vol. 100, Ref. 142, 883 x), blast furnace slag is granulated in a horizontal drum, which is provided with an internally cooled screw-like shaft and with a water-cooled wall. The slag is charged onto the rotating shaft and is dispersed and solidified and as granulated slag is removed through an opening formed in the bottom close to the end opposite the slag-charging end.

The known processes do not always satisfy the requirements or commercial practice and also, have the disadvantage that they can be performed only with difficulty in practice.

OBJECT OF THE INVENTION

It is an object of the invention to avoid the disadvantages of the previously known processes and to provide for the forming of metallurgical slag into lumps and granules, a simple and economical process and a suitable apparatus for carrying out the process.

SUMMARY OF THE INVENTION

In a process for granulating a slag, wherein molten slag is charged into a drum and is solidified and granulated therein on a cooled surface, this object is accomplished in accordance with the invention in that the molten slag is applied to the inside surface of a drum rotating on a horizontal axis and having an externally cooled shell and solidified film of slag is mechanically detached from the inside surface after about three-quarters of revolution of the drum and is discharged.

The process thus comprises the steps of:

(a) rotating a drum about a horizontal axis;
(b) cooling an internal surface of the drum by applying a coolant to an external shell thereof;
(c) pouring molten slag on the internal surface of the drum to form a film of slag which is solidified as it is entrained in rotation by the drum about the axis; and
(d) detaching pieces of the film from the internal surface and removing granulated slag in the form of the pieces after the film has been entrained through about three-quarters of a rotation of the drum.

In the process according to the invention, the molten slag is continuously or discontinuously poured onto the inside surface adjacent the bottom apex line throughout the length of the cooled shell of the drum.

The slag can be poured from a slag bucket suspended in a pouring device and through a pouring trough, which enters the drum adjacent to the bottom apex line of the drum.

Because the shell of the drum is already cooled adjacent the pouring zone, the molten slag will adhere to and will be solidified on the inside surface. Owing to the rotation of the drum, the adhering slag forms on the inside surface a film of slag in a thickness up to 5 mm and in entrained by and further cooled and solidified on the inside surface.

When the film of slag has moved through about three-fourths of a revolution of the drum it is detached in the form of lumps or granules by a detaching device. Such a detaching or peeling device my consist of a scraper or a rapping device or both, or a similar device.

The detaching device extends on the inside surface throughout the length of the cooled shell of the drum. The detached slag granules or small slag lumps are collected below the scraper in a suitable device and are discharged from the drum by that device, which suitably consists of a vibratory conveying trough. The latter protrudes from the substantially closed end of the drum which is opposite the slag-charging end and delivers the granular slag to another suitable conveyor, such as a belt conveyor or a wheeled container.

To avoid a falling of the detached granular slag from the conveyor trough into the slag overflow trough or into the molten slag, a coolable covering and/or collecting plate, can be disposed in the interior of the drum below the vibratory conveying trough and is downwardly inclined toward the horizontal and in the discharge direction. That plate has a width which is virtually equal to the diameter of the drum and a length which is equal to the length of the central portion of the drum. The covering plate is cleaned from time to time to remove any granular slag which may have accumulated thereon or may be inclined at such an angle that the plate will be self-cleaning and effect a discharge.

The process in accordance with the invention, can be used to granulate metallurgical slag of any kind and is particularly suitable for granulating slag from converters used for a primary and secondary production of copper, e.g. slag composed of 5 to 45% by weight Cu,
5 to 30% by weight Pb and'
10 to 35% by weight $SiO_2$.

In the process in accordance with the invention, the slag is at a temperature of about 1100° to 1200° C. as it is charged into the drum and is discharged as a solidified film of slag at a temperature of about 600° C. The detached granules are irregularly shaped lumps or platelike pieces having a thickness of about 5 mm and length and width dimensions of about 50 mm.

An advantage afforded by the process of granulating slag in accordance with the invention, is that the rotating drum continually makes fresh cooling surfaces available for cooling the molten slag and ideal conditions are ensured for the solidification of the slag, which has a poor thermal conductivity. The cooling water which has been heated can be delivered to a plant for the recovery of heat. In addition, smoke and fumes formed during the pouring operation can be entirely removed in a simple manner.

The apparatus for granulating molten slag can comprise a drum having an externally coolable shell and openings for charging molten material and for discharging granulated slag and is characterized by a cylindrical drum, which is substantially closed at both ends and is mounted by rings on rollers to be rotatable on a horizontal axis and has a central portion provided with means for externally cooling the shell of the drum, an annular gear for rotating the drum, and a pouring trough, which extends throughout the length of the drum and is open at one end of the drum, and means for detaching the solidified slag and for discharging the particulate slag through that end of the drum which is opposite the charging end.

The apparatus essentially consists of the cylindrical granulating drum proper, which is provided with cooling means, as a central part and two flange-connected end parts, which are provided each with a bearing race and a covering hood or drum cover, bearing race and annular gear. The annular gear serves to drive the drum. The drive is designed to rotate the drum at about 1 to 2 rpm. The central part of the drum apparatus in accordance with the invention, may be about 300 cm in diameter and may have a length of about 300 to 350 cm. The two end parts may have a length of about 150 cm each.

The central part of the drum apparatus in accordance with the invention, is provided with means for cooling the shell of the drum. Said cooling means may consist of spray nozzles and are provided outside of and below the shell of the drum at least in the region in which the liquid slag is poured (on the inside or internal surface). This will insure that a molten film will immediately adhere. Additinal nozzles are suitably arranged above the top apex line of the shell of the drum. As a result, cooling water will flow in contact with virtually the entire shell of the rotating drum. The cooling water which has been heated is collected in a tub below the drum and may be delivered to a plant for a recovery of heat.

A rapping and/or peeling device for detaching the solidified film of slag is mounted inside the apparatus in accordance with the invention, in its central drum part, at the top portion of the inside surface. The rapping device can comprise a hammer station, which suitably precedes a scraper in the direction of rotation of the drum.

A vibratory conveyor trough for discharging the detached slag granules is provided directly under the rapping and/or peeling device.

Any slag particles falling from the vibratory conveyor trough will be collected by a coolable collecting plate, which is disposed under said trough and is downwardly inclined toward the horizontal and in the discharge direction. This will ensure that solidified slag particles will not enter the liquid molten slag.

The collecting plate has a width which is approximately equal to the diameter of the drum and has the same length as the central part of the drum apparatus.

The drum apparatus is substantially closed at its exit by a nonrotating end disk. That closing end is provided with an exhaust pipe for removing smoke and fumes and serves also to carry and support the pouring trough, the vibratory conveying trough and the covering plate. The entrance of the drum apparatus and the preceding pouring device are substantially covered by a sheet metal hood so that a directed gas flow through the drum is ensured.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
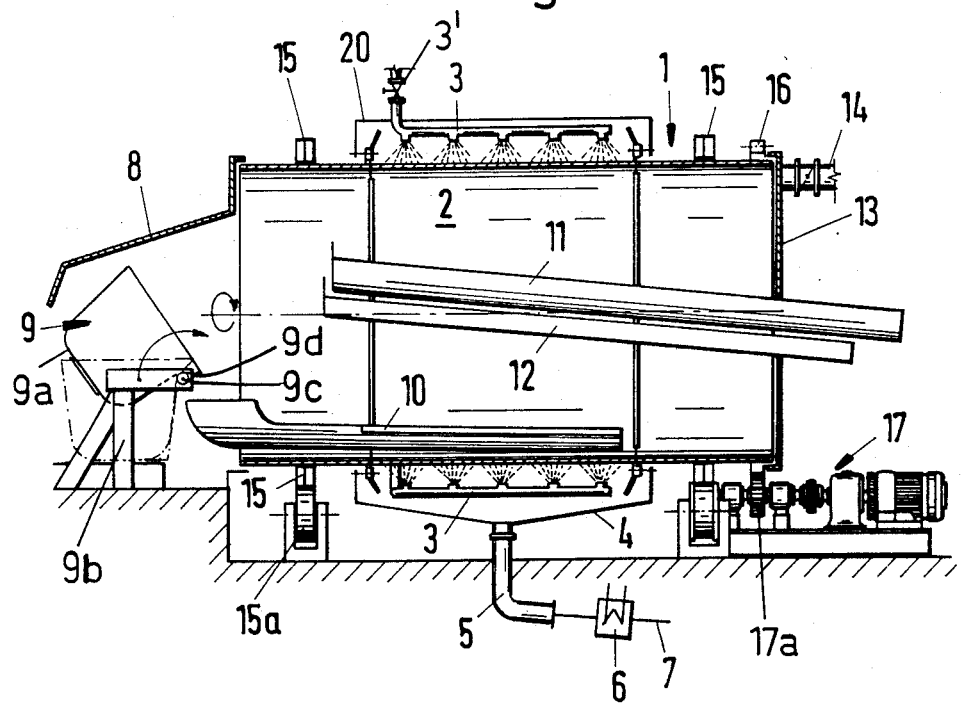
FIG. 1 is an axial cross-sectional view through an apparatus for carrying out the molten slag granulation method of the present invention.
Figure 2:
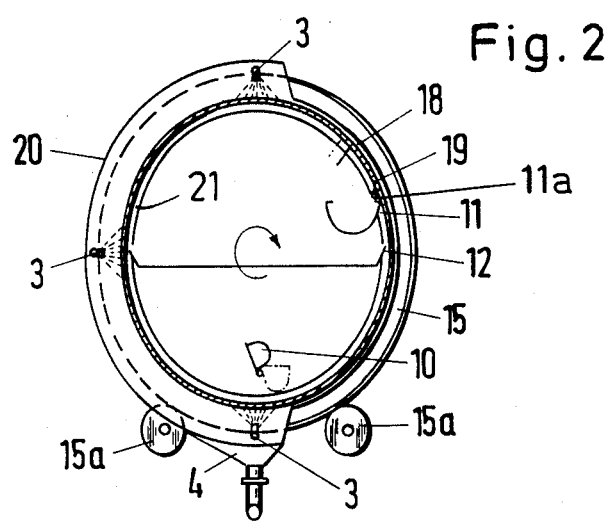
FIG. 2 is a somewhat oblique transverse section through a portion of this apparatus.

In FIGS. 1 and 2 of the drawing, we have shown a cooling drum 1 having a central part 2 which is actually cooled and constitutes the region into which the molten slag is poured.

The cooling means can comprise a shell or housing 20 surrounding the central portion of the cooling drum and provided with a spraying device 3 for spraying cooling water directly against the outer surface of this drum. A valve 3' controls the water flow.

As represented by a similar device spraying upwardly against the outer surface of the central portion of the drum represents the fact that such spray nozzles may be provided in angularly equispaced relationship all around the circumference of the drum.

A collecting basin 4 is formed beneath the central portion 2 of the drum to collect cooling water which runs off from the outer surface of the central portion and a duct 5 carries the cooled water to a heat exchanger 6 in which heat is recovered from the cooling water for use elsewhere in the plant. From line 7, cooling water from which valuable heat has been extracted, is recycled to the spray devices 3 by means not shown, e.g. a recirculating pump.

The apparatus also comprises, at the left-hand end of the drum as seen in FIG. 1 a covering hood for the slag-pouring device represented generally at 9. This slag-pouring device can include a tiltable slag bucket or ladle 9a which can be received in a frame 9b defining a tilting axis 9c about which the bucket may be titled.

Below the lip 9d of the tilted bucket is a pouring trough generally represented at 10 which can be tilted as shown in FIG. 2 to dump the molten slag along the inner surface of the central portion 2 of the drum 1 and subsequently uniformly over the entire axial length of this central portion of the drum.

To recover the solidified slag in granular form from the inner surface of the drum, a vibrating conveying trough 11 is provided and, as can be seen from FIG. 2, has an edge 11a which scrapes against the inner surface of the central portion of the drum 1 to peel off and rupture the slag which has solidified into a layer 21 thereon.

In addition, a rapping device 18 can act upon this layer 21 to assist in breaking it up and another peeling arrangement can be provided, if desired as represented diagonally by the peeling device 19.

Above the pouring trough 10, a collapsible covering and/or collecting plate 12 spans the width of the drum 1 at least in the central portion 2 thereof.

The right-hand end of the drum is closed by a nonrotating or stationary end disk 13 through which an exhaust pipe 14 communicates with the interior of the drum to evacuate gases evolved during the granulation process.

The drum 1 is supported so that it can rotate about its horizontal axis on bearing races 15 and rollers 15a. At the right-hand end, moreover, the drum was fitted with an annular gear 16 meshing with a drive pinion 17a connected to a drive motor and step-down gearing collectively represented at 17.

SPECIFIC DESCRIPTION AND EXAMPLE

As can be seen from the drawing, as the drum is rotated about its horizontal axis, the exterior of the drum is collected with water and molten metallurgical slag is poured from the bucket 9 into the pouring trough which is tilted in a controlled manner so that a layer of about 5 mm in thickness is formed on the inner surface of the drum and is rapidly solidified. This layer is broken-up by the rapping device 18 and peeled away from the drum by the trough 11 and the peeling device 19.

The pieces are broken off in an irregular step, but with major dimensions of about 50 mm.

New cooling surfaces are continually presented to the impinging slag by the rotation of the drum so that ideal conditions are provided for the solidification of the slag, which has a poor thermal conductivity. The slag which has solidified as a film can easily be detached from the inside surface and will be disintegrated further as it is detached.

SPECIFIC EXAMPLE

In an apparatus of the kind shown in FIG. 1, a slag bucket suspended in a bucket pouring device 9 is used to continuously pour converter slag from a copper smelter, which slag is at a temperature of 1100° to 1200° C. and is composed of 5 to 45% Cu
5 to 30% Pb
10 to 35% $SiO_2$ at a rate of 35,000 kg/h into the lower portion of the central part 2 of the cooling drum 1.

The slag is charged via a pouring trough, which is pivoted on an axis that is parallel to the axis of the drum. The steel drum is rotated at a speed of 1 to 1.5 rpm. Water is sprayed onto the shell of the drum to cool the same. In case of a temperature difference of 10° C., cooling water will be required at a rate of about 350 $m^3/h$. Owing to the rotation of the drum, the supply of liquid slag at a controlled rate onto the inside surface of the central part 2 will result in the spontaneous formation of a thin film of slag having a thickness of about 3 to 5 mm.

After about three-quarters of a revolution of the drum 1 the film of slag has been cooled to a temperature of about 600° C. and is then detached from the inside surface by means of the rapping device 18 and/or the peeling device 19.

The small slugs or granules of slag having a thickness of about 5 mm fall into a vibratory conveying trough 11 and are discharged by said trough and delivered for further use. Any slag particles falling out of the vibratory conveying trough 11 are collected by the covering plate 12, which is downwardly inclined toward the horizontal. The cooling water which has been heated is delivered to a plant 6 for recovering heat.

We claim:

1. A process for granulating a slag, comprising the steps of:
   (a) rotating a drum about a horizontal axis;
   (b) cooling an internal surface of said drum by applying a coolant to an external shell thereof;
   (c) pouring molten slag on said internal surface of said drum to form a film of slag which is solidified as it is entrained in rotation by said drum about said axis; and
   (d) detaching pieces of said film from said internal surface and removing granulated slag in the form of said pieces after said film has been entrained through about three-quarters of a rotation of said drum, said molten slag being poured onto said internal surface of said drum over substantially the entire length over which coolant is applied to said external shell by tilting a trough extending over said length and to which said molten slag is applied.

2. The process defined in claim 1 wherein said pieces are detached by a mechanical detaching device provided within said drum and intercepting said film after it has been entrained through about three-quarters of a rotation of said drum.

3. The process defined in claim 2 wherein said pieces are detached and carried away in a trough extending substantially the length of said drum, further comprising the step of vibrating said trough.

4. An apparatus for granulating molten slag, comprising:
   a cylindrical drum substantially closed at both ends and mounted by rings on rollers to be rotatable about a horizontal axis, said drum having a central portion;
   means for externally cooling an external surface at least of said central portion of the drum;
   an annular gear for rotating the drum;
   a pouring trough extruding throughout the length of the drum and open at a charging end of the drum; and
   means for detaching solidified slag from an internal surface of said drum at said central portion and for discharging the particulate slag through an end of the drum opposite the charging end.

5. The apparatus defined in claim 4 wherein cooling means are provided along said external surface of the drum at least in the pouring region of the internal surface of the drum.

6. The apparatus defined in claim 4 wherein a rapping and peeling device is provided along an upper portion of the internal surface.

7. The apparatus defined in claim 6 wherein a vibrating conveying trough is disposed below the rapping and peeling device and serves to discharge at that end of the drum which is opposite the charging end.

8. The apparatus defined in claim 7 wherein a covering plate is disposed in the interior of the drum below the vibratory conveying trough and extends virtually throughout the diameter and the length of the central portion of the drum and is downwardly inclined in a discharge direction.

* * * * *